(12) United States Patent
Altowairqi et al.

(10) Patent No.: US 12,405,140 B1
(45) Date of Patent: Sep. 2, 2025

(54) ADJUSTABLE VENTURI FOR MULTIPHASE FLOWMETER

(71) Applicant: SAUDI ARABIAN OIL COMPANY, Dhahran (SA)

(72) Inventors: Rashed Altowairqi, Dhahran (SA); Jawad Zahur, Dhahran (SA); Khalifa Al Binali, Dhahran (SA); Abdullah Aljindan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/671,890

(22) Filed: May 22, 2024

(51) Int. Cl.
　*G01F 1/50*　　(2006.01)
　*E21B 47/06*　　(2012.01)
　*E21B 47/10*　　(2012.01)
　*G01F 1/44*　　(2006.01)

(52) U.S. Cl.
　CPC .............. *G01F 1/50* (2013.01); *E21B 47/06* (2013.01); *E21B 47/10* (2013.01); *G01F 1/44* (2013.01); *E21B 2200/01* (2020.05)

(58) Field of Classification Search
　CPC ...... E21B 47/06; E21B 47/10; E21B 2200/01; G01F 1/50; G01F 1/44
　See application file for complete search history.

(56) References Cited

U.S. PATENT DOCUMENTS

| | | | | |
|---|---|---|---|---|
| 4,026,682 | A * | 5/1977 | Pausch | B01D 47/10 261/118 |
| 9,671,793 | B2 | 6/2017 | Atherton | |
| 2014/0299210 | A1* | 10/2014 | Atherton | G01F 1/74 137/624.27 |
| 2022/0357188 | A1* | 11/2022 | Brown | G01F 15/005 |

FOREIGN PATENT DOCUMENTS

| | | | | |
|---|---|---|---|---|
| CN | 108593019 | A * | 9/2018 | ............... G01F 1/44 |
| CN | 111006727 | A * | 4/2020 | ............... G01F 1/40 |
| CN | 112211752 | A | 1/2021 | |

OTHER PUBLICATIONS

Yoon et al., "Flow measurement and instrumentation flow control characteristics of throttling venturi valve with adjustable area," Flow Measurement and Instrumentation, vol. 81, Oct. 2021, 102034, 9 pages.

* cited by examiner

*Primary Examiner* — Caroline N Butcher
(74) *Attorney, Agent, or Firm* — Vorys, Sater, Seymour and Pease LLP (57) ABSTRACT

A flowmeter includes an inlet for receiving a wellbore fluid therein, an outlet for discharging the wellbore fluid and a stationary interior wall extending between the inlet and the outlet. A plurality of movable walls within the stationary interior wall defines a flow path therethrough. Each movable wall defines a threaded section on a first lateral end and rotatably supports an adjustment beam on a second lateral end. The adjustment beams include threads engaged with the threaded section of an adjacent movable wall. An actuator is operably coupled to an adjustment beam to rotate the adjustment beam and thereby drive the second lateral sides of the movable walls along the threaded sections of adjacent movable walls and adjust a diameter of the flow path. A sensor is operable to detect a parameter indicative of the pressures of the wellbore fluid from which a flowrate of the wellbore fluid may be determined.

15 Claims, 5 Drawing Sheets

ADJUSTABLE VENTURI FOR MULTIPHASE FLOWMETER

FIELD OF THE DISCLOSURE

The present disclosure relates generally to monitoring multiphase flow in conduits and, more particularly, to obtaining measurements of hydrocarbon mixtures flowing from a subterranean wellbore.

BACKGROUND OF THE DISCLOSURE

Hydrocarbon resources are often located in geologic formations that lie tens of thousands of feet below the earth's surface. In order to extract the hydrocarbon fluid, wellbores may be drilled through the geologic formations to access subterranean hydrocarbon reservoirs. Accurate measurement of hydrocarbon mixtures flowing out of a wellbore (e.g., oil, gas, water, and debris) may facilitate downstream processes such as separation of the hydrocarbon mixtures into single phase components.

One type of multiphase flowmeter (MPFM) that may be employed to measure the flow within or from a wellbore is a Venturi flowmeter. A Venturi flowmeter generally includes an inlet, an outlet and a chamber defining a flow path between the inlet and the outlet. A converging throat is defined in the chamber that restricts flow and thereby increases a velocity of the flow through the chamber. One or more sensors measure a pressure difference between the restricted and unrestricted flow, from which a total mass rate of the flow may be determined. The throat can be designed in different sizes where the size is determined based on the expected total mass flow rate, and hence, the differential pressure.

It may be difficult to select the optimal throat size for a Venturi flow for use in wellbore applications. For example, selecting an undersized throat size will result in differential pressure values above a maximum operational pressure envelope when fluids with high Gas-Oil ratios (GOR) are tested, and selecting an oversized throat size will result in differential pressure values below an operational pressure range when fluids with low GORs are tested. Since the composition of fluids flowing from a wellbore may change over time, selecting an optimal throat size may be exceptionally difficult.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a wellbore system includes a wellbore conduit fluidly coupled to a wellbore to receive a wellbore fluid therein, an adjustable flowmeter arranged within the wellbore conduit and an adjustment mechanism provided within the adjustable flowmeter. The adjustable flowmeter includes a flowmeter inlet for receiving the wellbore fluid from the wellbore conduit, a flowmeter outlet for discharging the wellbore fluid; and a stationary interior wall extending between the flowmeter inlet and the flowmeter outlet. The adjustment mechanism includes a plurality of movable walls disposed within the stationary interior wall and defining a flow path therethrough, each movable wall defining a threaded section on a first lateral end thereof, a plurality of adjustment beams, each adjustment beam being rotatably supported on a second lateral end of a respective one of the movable walls, and each adjustment beam including threads thereon engaged with the threaded section of an adjacent one of the plurality of movable walls, and an actuator operably coupled to at least one adjustment beam of the plurality of adjustment beams to rotate the at least one adjustment beam and thereby drive the second lateral end of each movable wall along the threaded section of an adjacent movable wall to thereby adjust a diameter of the flow path.

According to another embodiment consistent with the present disclosure, a method for measuring a flow of a wellbore fluid includes (a) receiving the wellbore fluid at an inlet of a flowmeter having a stationary interior wall defined therein, (b) flowing the wellbore fluid through a flow path defined through a plurality of movable walls disposed within the stationary interior wall, (c) rotating at least one adjustment beam supported on a lateral end of one of the plurality of movable walls and engaged with a threaded section on an adjacent one of the plurality of movable walls to drive the lateral end laterally along the threaded section and thereby adjust a diameter of the flow path, (d) detecting at least one parameter of the wellbore fluid indicative of a pressure of the wellbore fluid in the flow path, and (e) determining a flow rate of the wellbore fluid based on the at least one parameter of the wellbore fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

According to embodiments consistent with the present disclosure, a Venturi flowmeter may be modified to increase an interval over which the flowmeter provides accurate indications of the flowrate from a wellbore. The flowmeter may be modified by inserting an adjustment mechanism into a throat of the flowmeter to permit a diameter of a throat to be effectively modified (altered). The adjustment mechanism may include plurality of walls that are dynamically sealed to an interior of the throat. At intersections between the walls, a plurality adjusting beams may be provided that rotate to cause the walls to radially converge or diverge to adjust the throat diameter. The walls may include a threaded section thereon to engage corresponding threads on the adjusting beams, and the adjusting beams may be operably coupled to a hand wheel or other mechanism on an exterior of the flowmeter. The hand wheel may be operated based on a production rate of the wellbore.

Figure 1:
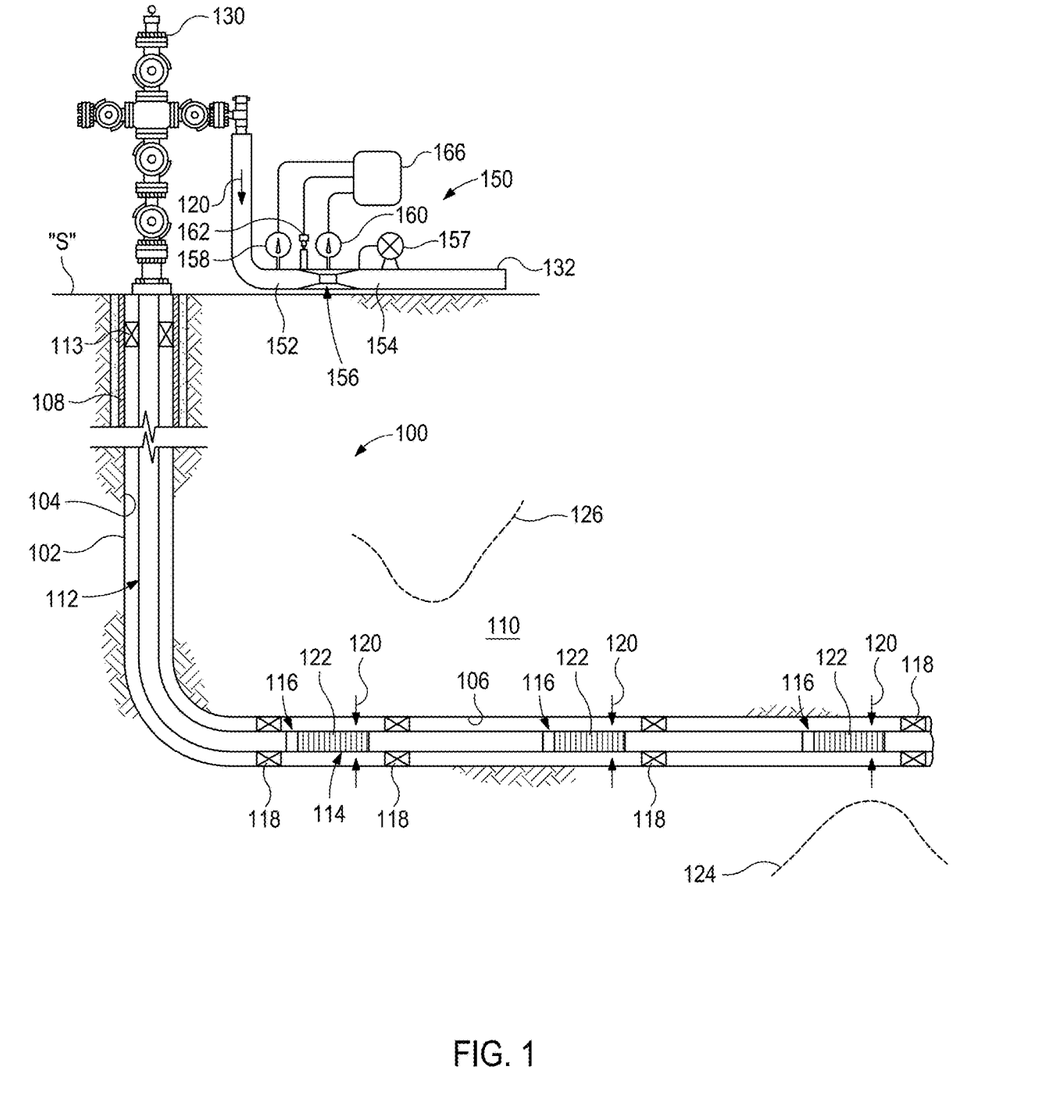
FIG. 1 is a schematic diagram of a wellbore system including an adjustable Venturi flowmeter for monitoring a multiphase flow from a wellbore in accordance with one or more aspects of the present disclosure.

FIG. 1 is a schematic diagram of an example wellbore system 100 that may employ one or more of the principles of the present disclosure. As depicted, the wellbore system 100 includes a wellbore 102 that extends through various earth strata and has a substantially vertical section 104 that transitions into a substantially horizontal section 106. A portion of the vertical section 104 may have a string of casing 108 cemented therein, and the horizontal section 106 may extend through a hydrocarbon bearing subterranean formation 110. In some embodiments, the horizontal section 106 may be uncompleted and otherwise characterized as an "open-hole" section of the wellbore 102. In other embodiments, however, the casing 108 may extend into the horizontal section 106, without departing from the scope of the disclosure.

A string of production tubing 112 may be positioned within the wellbore 102 and extend from a well surface location "S," such as the Earth's surface. The production tubing 112 provides a conduit for fluids extracted from the formation 110 to travel to the well surface location S for production. A hanger 113 is provided between the production tubing 112 and the casing 108. The hanger 113 may be carried by the production tubing 112 and may include radially expandable teeth or other structures that bite into the casing 108 and thereby hold the production tubing 112 in place within the wellbore 102.

A completion string 114 may be coupled to or otherwise form part of the lower end of the production tubing 112 and arranged within the horizontal section 106. The completion string 114 may be configured to divide the wellbore 102 into various production intervals or "zones" adjacent the subterranean formation 110. To accomplish this, as depicted, the completion string 114 may include a plurality of inflow control devices or "ICDs" 116 axially offset from each other along portions of the production tubing 112. In some embodiments, each inflow control device 116 may be positioned between a pair of wellbore packers 118 that provides a fluid seal between the completion string 114 and the inner wall of the wellbore 102, and thereby defining discrete production intervals or zones.

The inflow control devices 116 are operable to selectively regulate the flow of fluids 120 into the completion string 114 and, therefore, into the production tubing 112. In the illustrated embodiment, each inflow control device 116 includes a sand control screen assembly 122 that filters particulate matter out of the formation fluids 120 originating from the formation 110 such that particulates and other fines are not produced to the well surface location. After passing through the sand control screen assembly 122, the inflow control devices 116 may be operable to regulate the flow of the fluids 120 into the completion string 114. Regulating the flow of fluids 120 into the completion string 114 from each production interval may be advantageous in preventing water coning 124 or gas coning 126 in the subterranean formation 110. Other uses for flow regulation include, but are not limited to, balancing production from multiple production intervals, minimizing production of undesired fluids, maximizing production of desired fluids, etc.

As used herein, the term "fluid" or "fluids" (e.g., the fluids 120) includes liquids, gases, hydrocarbons, multi-phase fluids, mixtures of two of more fluids, water and fluids injected from the surface, such as water. Additionally, references to "water" includes fresh water but should also be construed to also include water-based fluids; e.g., brine or salt water. In accordance with embodiments of the present disclosure, the inflow control devices 116 may have a number of alternative structural features that provide selective operation and controlled fluid flow therethrough.

It should be noted that even though FIG. 1 depicts the inflow control devices 116 as being arranged in an open-hole portion of the wellbore 102, embodiments are contemplated herein where one or more of the inflow control devices 116 is arranged within cased portions of the wellbore 102. Also, even though FIG. 1 depicts a single inflow control device 116 arranged in each production interval, any number of inflow control devices 116 may be deployed within a particular production interval without departing from the scope of the disclosure. In addition, even though FIG. 1 depicts multiple production intervals separated by the packers 118, any number of production intervals with a corresponding number of packers 118 may be used. In other embodiments, the packers 118 may be entirely omitted from the completion interval, without departing from the scope of the disclosure.

Furthermore, while FIG. 1 depicts the inflow control devices 116 as being arranged in the horizontal section 106 of the wellbore 102, the inflow control devices 116 are equally well suited for use in the vertical section 104 or portions of the wellbore 102 that are deviated, slanted, multilateral, or any combination thereof. The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the wellbore 102.

A wellhead 130 is installed at the surface location "S." The wellhead 130 generally provides a suspension point for the string of casing 108 and the production tubing 112 and also provides pressure control for the wellbore 102. The wellhead 130 may include a system of valves and adaptors that distribute wellbore fluids 120 produced through the production tubing 112 to an appropriate destination. For example, wellbore fluids 120 may be directed from the production tubing 112 through the wellhead 130 to a surface conduit 132, which may extend to a gas-oil separation plant (GOSP), a collection tank, a pipeline or another downstream destination.

In accordance with certain embodiments of the present disclosure, an adjustable Venturi flowmeter 150 may be defined (or provided) within the surface conduit 132 for monitoring (regulating) the wellbore fluid 120 exiting the wellbore 102. The flowmeter 150 may include an inlet 152 for receiving a multiphase flow from the wellbore 102 and an outlet 154 defined between the wellhead 130 and the downstream destination. The flowmeter 150 may include a throat chamber 156 defined between the inlet 152 and the outlet 154. As described in greater detail below, the throat chamber 156 may receive or include an adjustment mechanism 202 (FIG. 2) therein, which is operable to adjust an effective throat diameter "D" (FIG. 2) of the flowmeter 150. A hand wheel 157 is provided at the surface location "S" and is operably coupled to the adjustment mechanism 202 for manually adjusting the effective throat diameter "D" of the flowmeter 150. In other embodiments, a motor or other actuator may be provided in place of the hand wheel 157 without departing from the scope of the disclosure.

The flowmeter 150 may include one or more inlet gauges or sensors 158 and one or more throat gauges or sensors 160 operable to detect a parameter indicative of a pressure of the wellbore fluid 120 upstream of and within the flowmeter 150. The inlet sensors 158 may monitor an unrestricted flow of the wellbore fluid 120 into the inlet 152 while the throat sensors 160 may monitor a restricted flow of the wellbore fluid 120 within the adjustment mechanism 202 (FIG. 2) and within the chamber 156. In some embodiments, the throat sensor 160 and/or an additional sensor (not shown) may detect and monitor a pressure of a flow at the outlet 154 of the flowmeter 150.

In some embodiments, the flowmeter 150 may also include an orifice gauge or sensor 162 operable to detect a parameter indicative of a position or state of the adjustment mechanism 202 from which a diameter of a flow path 302 (FIG. 3B) may be determined. The orifice sensor 162 may comprise a position sensor, one or more proximity sensors, a displacement sensor or another mechanism recognized in the art. In other embodiments, the orifice sensor 162 may be omitted, without departing from the scope of the disclosure.

The inlet sensor 158, the throat sensor 160 and the orifice sensor 162 may each be communicably coupled to a controller 166 operable to determine a flow rate and/or other characteristics of the wellbore fluid 120 passing through the flowmeter 150. As illustrated in FIG. 1, the controller 166 may be provided at the surface location "S" where an operator may monitor data provided by the sensors 158, 160 and 162. In other embodiments, the controller 166 may be located downhole or at other available locations. In some embodiments, the controller 166 may be a computer-based system that may include a processor, a memory storage device, and programs and instructions, accessible to the processor for executing the instructions utilizing the data stored in the memory storage device. In some embodiments, the controller 166 may also include manual controls and visual displays that may be manipulated and monitored by an operator to ascertain flow characteristics of the wellbore fluid 120 passing through the surface conduit 132.

Although one or more adjustable Venturi flowmeters 150 may alternatively or additionally be provided at select downhole locations, positioning the flowmeters downhole may add restrictions to the wellbore fluid, resulting in complication in wellbore design and compromising wellbore integrity and performance. Thus, the flowmeter 150 will normally be provided within the surface conduit 132 as illustrated in FIG. 1.

Figure 2:
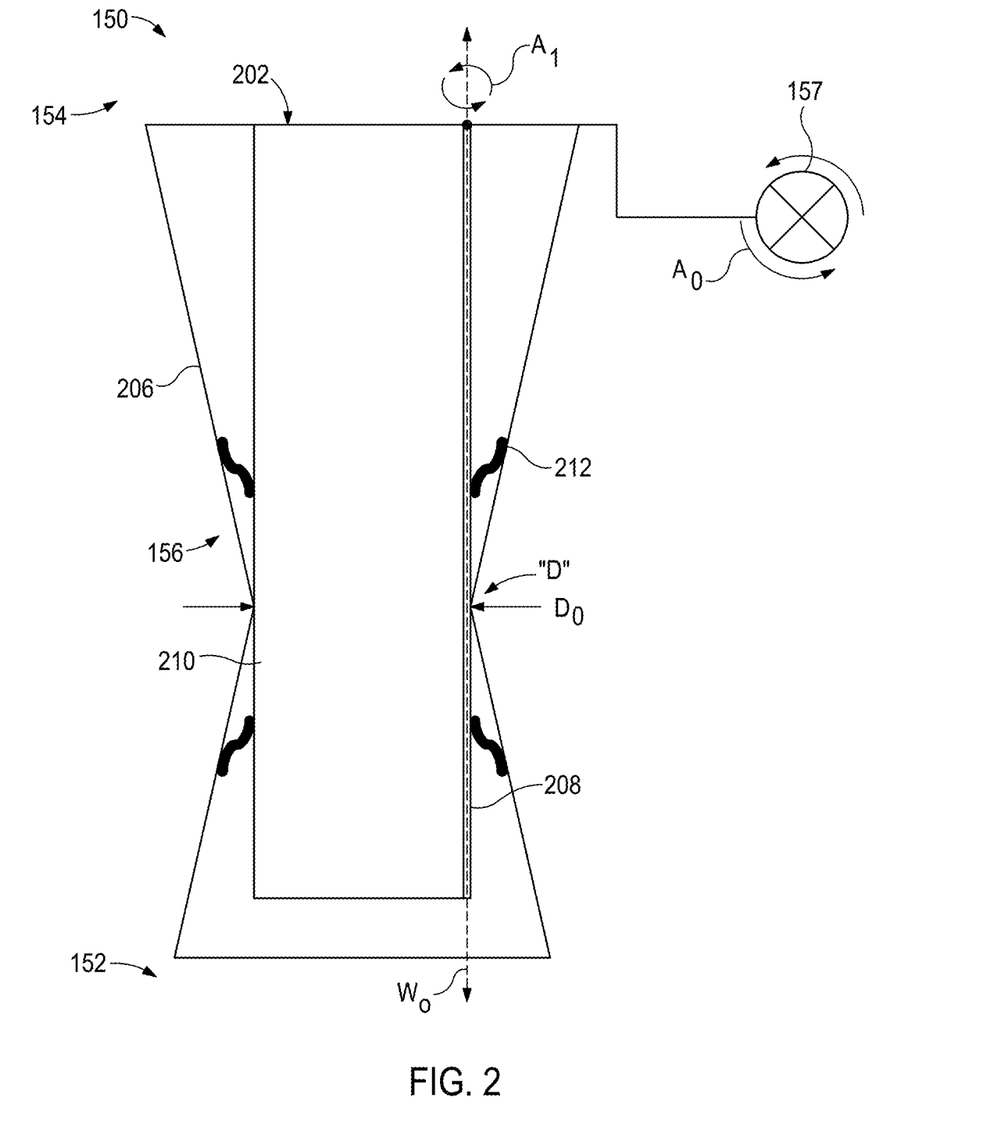
FIG. 2 is a schematic view of the flowmeter of FIG. 1 illustrating an adjustment mechanism inserted into a throat of the flowmeter and an actuator disposed outside the flowmeter.

Referring to FIG. 2, an enlarged schematic view of the flowmeter 150 is provided. As illustrated, the flowmeter 150 includes an adjustment mechanism 202 inserted into (provided within) the throat chamber 156 of the flowmeter 150. The throat chamber 156 is defined by interior walls 206 that converge from the inlet 152 and diverge toward the outlet 154 of the flowmeter 150. The interior walls 206 may be fixed or stationary and define an initial throat diameter Do at a narrowest point of the throat chamber 156. Generally, the initial throat diameter Do represents an effective throat diameter "D" of the flowmeter 150 prior to insertion (incorporation) of the adjustment mechanism 202. With the adjustment mechanism 202 inserted (included), the effective diameter "D" may be selectively adjusted by manipulating the hand wheel 157.

The adjustment mechanism 202 generally includes one or more rotatable adjustment beams 208 and a plurality of movable walls 210 operably coupled to the adjustment beams 208. The adjustment beams 208 may each be constructed of an elongated steel rod, which may include helical threads (not shown) on at least a portion of its outer surface. The adjustment beam 208 may be induced to rotate about a beam axis Wo extending longitudinally therethrough by manipulating the hand wheel 157. For example, rotation of the hand wheel 157 in the direction of arrows $A_0$ may cause the adjustment beam 208 to rotate in the direction of arrows $A_1$. In some embodiments, the hand wheel 157 is operably coupled to each of the adjustment beams 208 in an adjustment mechanism (see, e.g., FIG. 3A) by a gear set (not shown) such that rotation of the hand wheel 157 induces (causes) simultaneous rotation of each of the adjustment beams 208 through the gear set. Depending on the direction of rotation $A_1$, rotating the adjustment beams 208 will cause the walls 210 to converge or diverge and thereby adjust the effective throat diameter "D" as described in greater detail below.

The movable walls 210 may be sealed to the interior walls 206 of the flowmeter 150 with dynamic seal members 212. The dynamic seal members 212 may include a flexible elastomeric membrane that maintains a seal even as the movable walls 210 converge and diverge within the throat chamber 156. The dynamic seal members ensure that wellbore fluids 120 are directed through the adjustment mechanism, and are prohibited from traveling between the adjustment mechanism and the inner walls 206.

Figure 3A:
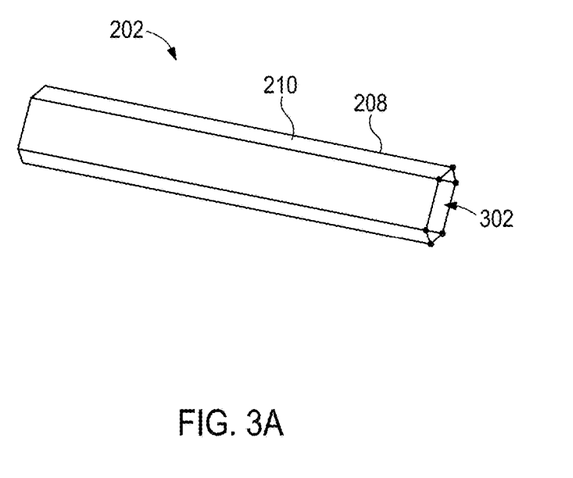
FIGS. 3A and 3B are perspective and side views, respectively, of the adjustment mechanism in an expanded configuration wherein a plurality of walls is radially diverged from one another.
Figure 3B:
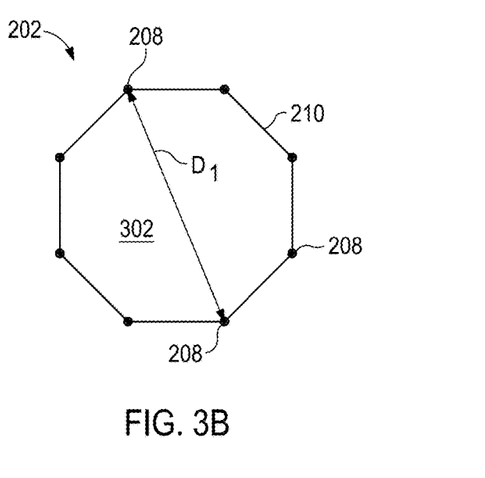

Referring to FIGS. 3A and 3B, the adjustment mechanism 202 is illustrated in an expanded configuration wherein the plurality of movable walls 210 are radially diverged from one another. In the embodiments illustrated, eight movable walls 210 are constructed as generally flat plates and are arranged in an octagonal configuration. In a non-limiting example, the flat plates may be constructed of rolled sheet metal or a substantially rigid material. Eight adjustment beams 208 are provided at the vertices of the octagon, for example, extending along a longitudinal edge of the movable walls 210. Each of the adjustment beams 208 is rotatably secured to a respective movable wall 210 and engages an adjacent movable wall 210. In other embodiments, more or fewer generally flat movable walls 210 may be provided to form other polygonal shapes (e.g., triangle, hexagon, decagon, etc.) and/or curved movable walls (not shown) may be provided to define an oval, ovoid (e.g., egg-shaped) or another rounded configuration.

In the expanded configuration, a flow path 302 extending through the movable walls 210 defines an extended diameter $D_1$ between angularly opposite adjustment beams 208. The adjustment mechanism 202 may be moved (transitioned) to the extended configuration to accommodate relatively high mass flow rates through the flow path 302, for example.

Figure 3C:
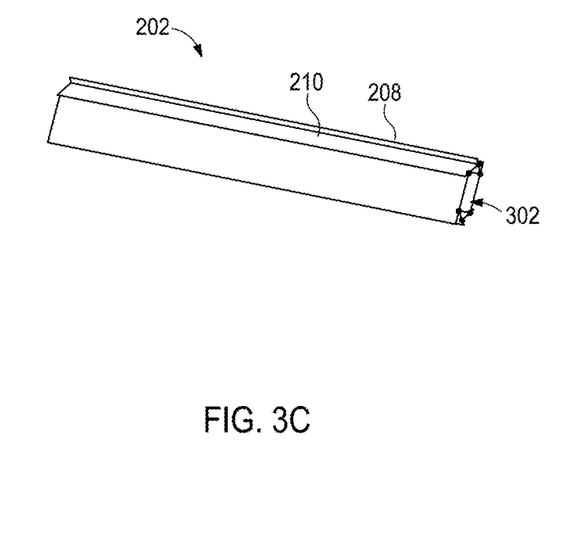
FIGS. 3C and 3D are perspective and side views, respectively, of the adjustment mechanism in a retracted configuration wherein the plurality of walls is radially converged with one another.
Figure 3D:
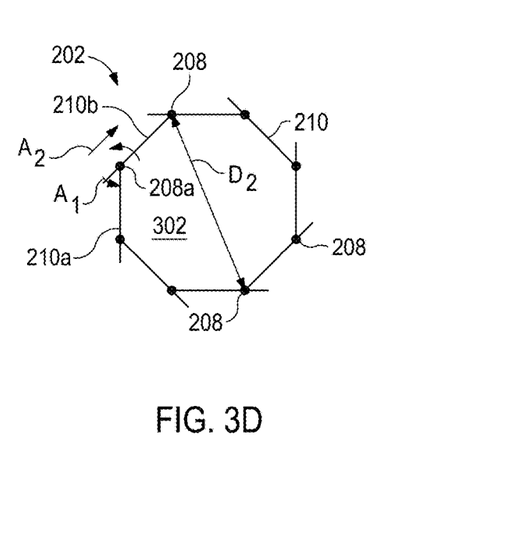

Referring to FIGS. 3C and 3D, the adjustment mechanism 202 may be moved to a retracted configuration wherein the plurality of movable walls 210 are radially converged toward one another. To move the adjustment mechanism 202 to the retracted configuration, one or more of the adjustment beams 208 may be rotated in the direction of arrows $A_1$. For example, an adjustment beam 208a coupled to an end of one of the movable walls 210a may be rotated in the direction of arrows $A_1$ to translate the adjustment beam 208a, and the connected movable wall 210a, along a movable wall 210b engaged by the adjustment beam 208a in the direction of arrow $A_2$. Each of the remaining adjustment beams 208 may be similarly rotated to translate together with a connected movable wall 210 along an adjacent movable wall 210. In some embodiments, the remaining adjustment beams 208 may be rotated directly or indirectly through a gear set (not shown) by the hand wheel 157 (FIG. 2). In other embodiments, the remaining adjustment beams 208 may be induced to rotate by movement of the adjustment beam 208a along the movable wall 210b. In the retracted configuration, the flow path 302 defines a retracted diameter $D_2$ between opposite adjustment beams 208. The adjustment mechanism 202 may be moved to the retracted configuration to accommodate relatively low mass flow rates through the flow path 302.

Figure 4A:
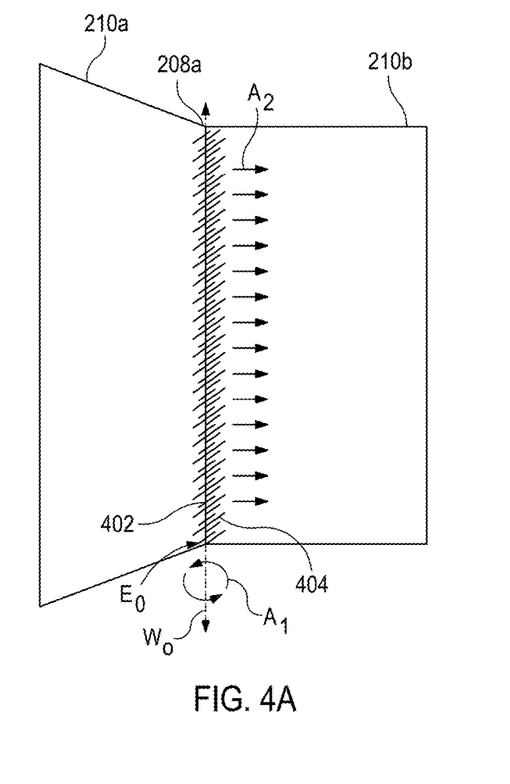
FIG. 4A is a perspective view of an intersection between two walls of the adjustment mechanism illustrating a threaded section of one of the walls engaged with corresponding threads on a rotatable adjustment beam coupled to the other one of the walls.
Figure 4B:
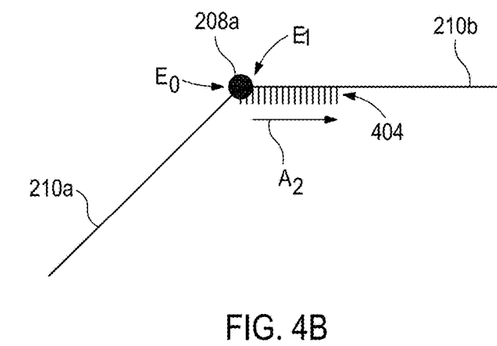
FIGS. 4B and 4C are end views of the intersection of FIG. 4A with the adjustment mechanism in the expanded and retracted configurations, respectively.
Figure 4C:
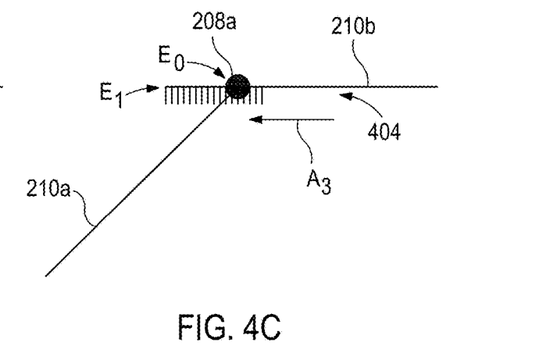

Referring to FIGS. 4A through 4C, an intersection between movable walls 210a, 210b is illustrated. The adjustment beam 208a is rotatably coupled to a longitudinal edge $E_0$ at a lateral end of the moveable wall 210a. The adjustment beam 208a may be secured to the longitudinal edge $E_0$ with any type of bearings and/or hardware recognized in the art that will permit rotation of the adjustment beam about the axis $X_0$ in the direction of arrows $A_1$. Threads 402 defined on the adjustment beam 208a are engaged with a threaded section 404 defined on at a lateral end of the movable wall 210b such that rotation of the adjustment beam 208 drives the adjustment beam 208a and the movable wall 210a laterally in the direction of arrow $A_2$ along the movable wall 210b. In some embodiments, the threaded section 404 extends longitudinally along an entire length of the movable wall 210b. Motion of the movable wall 210a in the direction of arrow $A_2$ moves the movable wall 210a from an extended position illustrated in FIG. 4B to a retracted position illustrated in FIG. 4C. In the extended position, the longitudinal edge $E_0$ of movable wall 210a is generally aligned with a longitudinal edge $E_1$ of the movable wall 210b. In the retracted position, the longitudinal edge $E_0$ if offset from the longitudinal edge $E_1$ along the movable wall 210b. The adjustment beam 208a may be rotated in an opposite direction to drive the movable wall 210a back to the extended position in the direction of arrow $A_3$.

Figure 5:
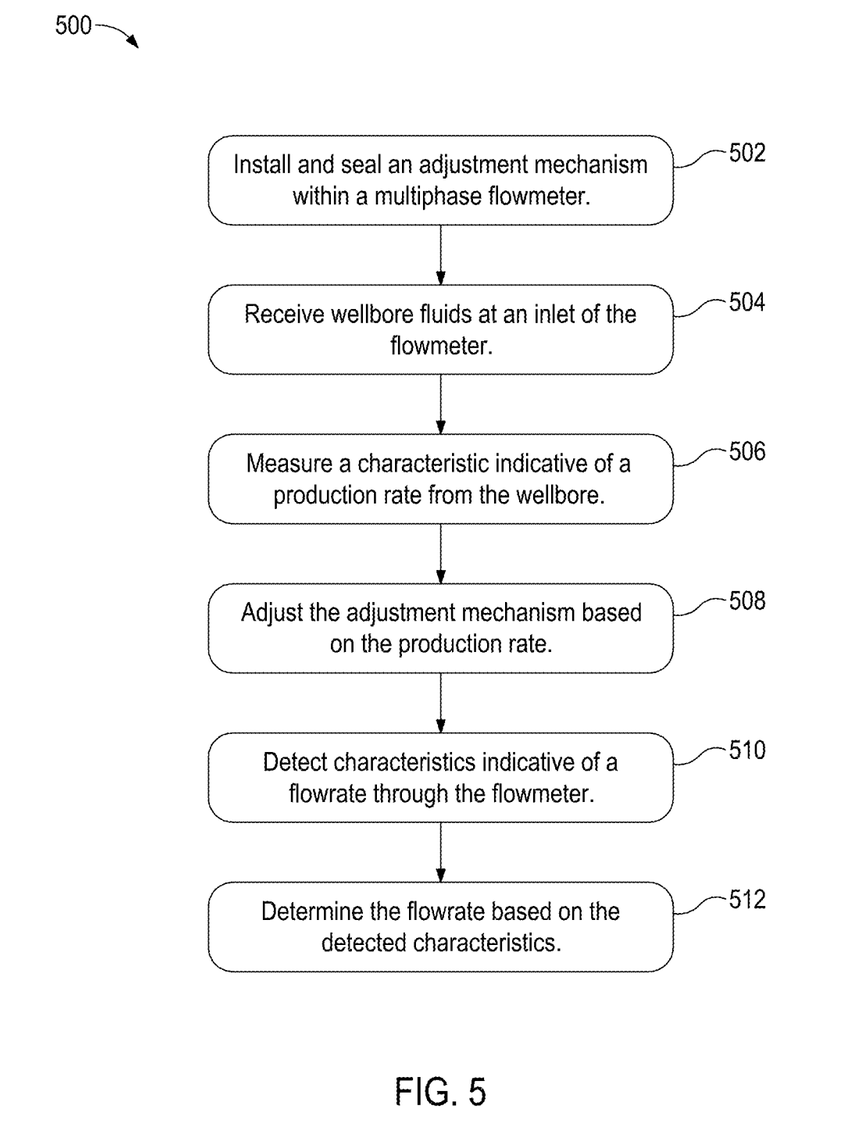
FIG. 5 is schematic flowchart illustrating an example procedure for measuring a multiphase fluid flow with the adjustable Venturi flowmeter in accordance with one or more aspects of the present disclosure.

Referring now to FIG. 5, and with reference to FIGS. 1 through 4C, an example procedure 500 for determining flow rate data using the dynamic adjustable flowmeter 150 is illustrated. Initially at step 502, an adjustment mechanism may be installed and sealed within a multiphase flowmeter. In some embodiments, an existing flowmeter including fixed or stationary interior walls 206 may be selected for modification. The existing flowmeter may be isolated, depressurized and drained of any fluid therein. The flowmeter may then be disassembled to place an adjustment mechanism 202 in an interior thereof. Dynamic seal members 212 may be installed around the adjustment mechanism 202 to prevent flow through an annulus defined radially between the adjustment mechanism 202 and the interior walls 206 of the flowmeter 150. The dynamic seal members 212 may be engaged with the stationary interior walls 206 of the flowmeter 150 as well as the movable walls 210 to isolate the annular area between the existing flowmeter 150 and the adjustment mechanism 202 installed therein. The dynamic seal members 212 may be sufficiently flexible to maintain contact with the walls 206, 210 as the movable walls 210 are operated through an operational range of travel. The adjustable flowmeter 150 may then be formed by reassembling any components of the existing flowmeter that were removed.

The procedure 500 may then proceed to step 504 where a wellbore fluid 120 is received at the inlet 152 of the flowmeter 150 in an unrestricted state. The wellbore fluid may be received from the surface conduit extending from the wellhead 130, for example. The inlet 152 may be provided within surface conduit 132, completion string 114 or another conduit fluidly coupled to or associated with the wellbore 102. The wellbore fluid 120 flows through the flow path 302 through the adjustment mechanism where the wellbore fluid 120 is restricted. As the wellbore fluid 120 flows through the flow path 302 a characteristic indicative of a production rate from the wellbore 102 may be measured (step 506 For example, the throat sensor 160 and/or the inlet sensor 158 may detect a pressure, a differential pressure across the flowmeter 150 between the inlet 152 and the outlet 154, or another characteristic of the wellbore fluid 120 in the flowmeter from which a production rate may be determined or estimated. In some embodiments, the adjustment mechanism 202 may first be moved to an extended configuration to define a maximum diameter $D_1$ through the flow path.

Next, at step 508, if necessary, the adjustment mechanism 202 may be adjusted based on the production rate. The handwheel 157 or other actuator may be turned to extend or retract the movable walls 210 of the adjustment mechanism to thereby adjust a diameter $D_1$, $D_2$ of the flow path 302 to an appropriate size based on the production rate determined such that a sufficient pressure differential across the flowmeter 150 is provided. In some embodiments, an operator may assess differential pressure readings across the flowmeter 150 that correspond with various adjustment positions across an operating envelope adjustment mechanism 202. Through trial and error, the operator may determine the differential pressure reading providing the most accurate flow rate determinations. In this manner, the operator may calibrate the flowmeter 150, and then adjust the adjustment mechanism 202 at step 508 to provide a predetermined pressure differential. At step 510 characteristics indicative of a flowrate through the flowmeter may be detected. The inlet sensor 158, throat sensor 160 and/or orifice sensor 162 may be employed to detect the characteristics. At step 512, a flow rate of the wellbore fluid 120 may be determined with the controller 166 based on data provided by the inlet sensor 158, throat sensor 160 and/or orifice sensor 162. The controller 166 may provide a visual display of the flow rate determined and/or may operate a controlled device based on the flow rate determined. A controlled device may include a valve on the wellhead 130 or a component of a GOSP or other downstream system (not shown), for example.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A wellbore system, comprising:
a wellbore conduit fluidly coupled to a wellbore to receive a wellbore fluid therein;
an adjustable flowmeter arranged within the wellbore conduit and including:
a flowmeter inlet for receiving the wellbore fluid from the wellbore conduit;
a flowmeter outlet for discharging the wellbore fluid; and
a stationary interior wall extending between the flowmeter inlet and the flowmeter outlet; and
an adjustment mechanism provided within the adjustable flowmeter and including:
a plurality of movable walls disposed within the stationary interior wall and defining a flow path therethrough, each movable wall defining a threaded section on a first lateral end thereof;
a plurality of adjustment beams, each adjustment beam being rotatably supported on a second lateral end of a respective one of the movable walls, and each adjustment beam including threads thereon engaged with the threaded section of an adjacent one of the plurality of movable walls;
an actuator operably coupled to at least one adjustment beam of the plurality of adjustment beams to rotate the at least one adjustment beam and thereby drive the second lateral end of each movable wall along the threaded section of an adjacent movable wall to thereby adjust a diameter of the flow path.

2. The wellbore system of claim 1, wherein each movable wall is constructed of a metallic material and is generally flat between the first and second lateral ends thereof.

3. The wellbore system of claim 2, wherein the plurality of movable walls is arranged in a polygonal arrangement with the plurality of adjustment beams supported at vertices defined by the polygonal arrangement.

4. The wellbore system of claim 1, wherein the actuator includes a hand wheel disposed at a surface location outside the wellbore.

5. The wellbore system of claim 1, further comprising a dynamic seal established between the stationary interior wall and the plurality of movable walls.

6. The wellbore system of claim 1, wherein the wellbore conduit is a surface conduit extending from a wellhead disposed above the wellbore.

7. The wellbore system of claim 1, further comprising:
at least one sensor operable to detect a parameter indicative of a flowrate of the wellbore fluid through the through the flow path; and
a controller operatively coupled to the at least one sensor to determine a flow rate of the wellbore fluid based on data provided by the at least one sensor.

8. The wellbore system of claim 7, further comprising an orifice sensor operable to detect a parameter indicative of a position or state of the plurality of movable walls from which the diameter of the flow path may be determined, and wherein the controller is operatively coupled to the orifice sensor to determine the flow rate of the wellbore fluid based on data provided by the orifice sensor.

9. A method for measuring a flow of a wellbore fluid, the method comprising:
receiving the wellbore fluid at an inlet of a flowmeter having a stationary interior wall defined therein;
flowing the wellbore fluid through a flow path defined through a plurality of movable walls disposed within the stationary interior wall;
rotating at least one adjustment beam supported on a lateral end of one of the plurality of movable walls and engaged with a threaded section on an adjacent one of the plurality of movable walls to drive the lateral end laterally along the threaded section and thereby adjust a diameter of the flow path;
detecting at least one parameter of the wellbore fluid indicative of a pressure of the wellbore fluid in the flow path; and
determining a flow rate of the wellbore fluid based on the at least one parameter of the wellbore fluid.

10. The method of claim 9, wherein rotating the at least one adjustment beam includes rotating a hand wheel disposed at a surface location outside a wellbore.

11. The method of claim 10, wherein rotating the at least one adjustment beam includes rotating a plurality of adjustment beams arranged in at vertices of a polygonal arrangement defined by the movable walls.

12. The method of claim 9, further comprising installing the plurality of movable walls in the stationary interior wall and establishing a dynamic seal between the stationary interior wall and the plurality of movable walls.

13. The method of claim 9, further comprising producing the wellbore fluid from a wellbore into a surface conduit, and wherein receiving the wellbore fluid includes receiving the wellbore fluid from the surface conduit.

14. The method of claim 9, further comprising detecting a parameter indicative of the diameter of the flow path, and wherein determining the flow rate of the wellbore fluid further includes determining the flow rate of the wellbore fluid based on the parameter indicative of the size of the orifice.

15. The method of claim 14, further comprising operating a controlled device based on the flow rate determined.

\* \* \* \* \*